(12) United States Patent
Lim et al.

(10) Patent No.: US 11,902,594 B2
(45) Date of Patent: *Feb. 13, 2024

(54) APPARATUS AND METHOD FOR VIDEO ENCODING OR DECODING

(71) Applicant: SK TELECOM CO., LTD., Seoul (KR)

(72) Inventors: Jeong-yeon Lim, Seoul (KR); Jae-seob Shin, Seoul (KR); Se-hoon Son, Seoul (KR); Sun-young Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,393

(22) Filed: Jan. 20, 2023

(65) Prior Publication Data

US 2023/0156240 A1    May 18, 2023

Related U.S. Application Data

(63) Continuation of application No. 17/380,419, filed on Jul. 20, 2021, now Pat. No. 11,595,700, which is a
(Continued)

(30) Foreign Application Priority Data

Jan. 9, 2017 (KR) .................. 10-2017-0003156
Jan. 4, 2018 (KR) .................. 10-2018-0001062

(51) Int. Cl.
*H04N 7/12* (2006.01)
*H04N 19/96* (2014.01)
*H04N 19/103* (2014.01)
*H04N 19/176* (2014.01)
*H04N 19/122* (2014.01)
(Continued)

(52) U.S. Cl.
CPC .......... *H04N 19/96* (2014.11); *H04N 19/103* (2014.11); *H04N 19/119* (2014.11); *H04N 19/12* (2014.11); *H04N 19/122* (2014.11); *H04N 19/176* (2014.11); *H04N 19/647* (2014.11)

(58) Field of Classification Search
CPC .................................................. H04N 19/119
See application file for complete search history.

(56) References Cited

U.S. PATENT DOCUMENTS 8,842,731 B2    9/2014 Jung et al.
2003/0048955 A1    3/2003 Pardas et al.
(Continued)

FOREIGN PATENT DOCUMENTS

CN         103250416 A    8/2013
KR    10-2014-0113854 A    9/2014
(Continued)

OTHER PUBLICATIONS

International Search Report dated Apr. 16, 2018 in connection with counterpart International Patent Application No. PCT/KR2018/000264, citing the above references (6 pages).
(Continued)

*Primary Examiner* — Y Lee
(74) *Attorney, Agent, or Firm* — Hauptman Ham, LLP

(57) ABSTRACT

Disclosed herein are a QTBT split structure allowing blocks of various shapes capable of more efficiently reflecting various local characteristics of video and a method of efficiently signaling the split structure.

7 Claims, 13 Drawing Sheets

Related U.S. Application Data continuation of application No. 16/505,080, filed on Jul. 8, 2019, now Pat. No. 11,102,517, which is a continuation of application No. PCT/KR2018/000264, filed on Jan. 5, 2018.

(51) Int. Cl.
*H04N 19/119* (2014.01)
*H04N 19/12* (2014.01)
*H04N 19/64* (2014.01)

(56) References Cited

U.S. PATENT DOCUMENTS

| | | |
|---|---|---|
| 2013/0202030 A1 | 8/2013 | Song et al. |
| 2013/0266067 A1 | 10/2013 | Song et al. |
| 2014/0254686 A1 | 9/2014 | Lim et al. |
| 2018/0176560 A1 | 6/2018 | Mishurovskiy et al. |
| 2019/0057545 A1 | 2/2019 | Varekamp et al. |

FOREIGN PATENT DOCUMENTS

| | | |
|---|---|---|
| KR | 10-1595899 B1 | 2/2016 |
| KR | 10-2016-0138130 A | 12/2016 |
| KR | 10-1681303 B1 | 12/2016 |
| WO | 2009-136051 A2 | 11/2009 |
| WO | 2015-142070 A1 | 9/2015 |
| WO | 2016/090568 A1 | 6/2016 |
| WO | 2016-091161 A1 | 6/2016 |
| WO | 2016/155641 A1 | 10/2016 |

OTHER PUBLICATIONS

Chinese Office Action dated Sep. 9, 2022, in connection with the Chinese Patent Application No. 201880005760.8, citing the above references (10 pages).

(a) up-type  (b) down-type  (c) left-type  (d) right-type

APPARATUS AND METHOD FOR VIDEO ENCODING OR DECODING

CROSS-REFERENCE TO RELATED APPLICATION

This application is a continuation of U.S. patent application Ser. No. 17/380,419, filed on Jul. 20, 2021, which is a continuation of U.S. patent application Ser. No. 16/505,080, filed on Jul. 8, 2019 which is a continuation of International Application No. PCT/KR2018/000264, filed on Jan. 5, 2018 which is based upon and claims the benefit of priorities to Korean Patent Application 10-2017-0003156, filed on Jan. 9, 2017 and Korean Patent Application No. 10-2018-0001062, filed on Jan. 4, 2018, in the Korean Intellectual Property Office, which are incorporated herein in their entireties by reference.

TECHNICAL FIELD

The present invention relates to video encoding or decoding for efficiently encoding video. More particularly, the present invention relates to a block splitting method capable of more actively considering various characteristics of videos and a technique for signaling corresponding split information.

BACKGROUND

The statements in this section merely provide background information related to the present disclosure and may not constitute prior art.

FIG. 1 is a conceptual diagram of an exemplary quadtree block structure for a coding tree unit (CTU). According to the high efficiency video coding (HEVC) standard, a CTU is divided into coding units (CUs) using a quadtree structure as a coding tree to reflect various local characteristics in a video. As illustrated in FIG. 1, a CU split structure resulting in the best coding efficiency is selected while recursively dividing the CTU having a maximum size of 64×64 up to a minimum size of 4×4 using a quadtree scheme. Each CU is divided into prediction units (PUs). After the PUs are determined and the prediction operation is performed, the CU is divided into a transformation unit (TU) for the residual block. In FIG. 1, rectangular PUs divided by a dotted line are illustrated.

Recently, a Quadtree plus Binary tree (QTBT) structure has been newly discussed, and attempts have been made to reflect various local characteristics of video data while eliminating the existing CU, PU, and TU concepts.

SUMMARY

It is an object of the present invention to provide a QTBT split structure allowing blocks of various shapes capable of more efficiently reflecting various local characteristics of video and a method of efficiently signaling the split structure.

In accordance with one aspect of the present invention, provided is a method for decoding video data, including receiving a bitstream including a block of encoded video data and split information related to the block of the video data; and determining a quadtree plus binarytree (QTBT) split structure for the block of the video data using the split information. Herein, the QTBT split structure is configured such that a binary tree is rooted from a leaf node of a quadtree, wherein the binary tree is defined by split types for splitting a parent node into two child nodes, the split types including a triangular type and a rectangular type. The method further includes decoding the block of the encoded video data in the unit of blocks respectively corresponding to leaf nodes of the QTBT. In the binary tree, child nodes of a parent node split according to the triangular type are not further split, while child nodes of a parent node split according to the rectangular split type are allowed to be split into two child nodes.

In accordance with another aspect of the present invention, provided is an apparatus for decoding video data, including a memory; and one or more processors. That is, the one or more processors are configured to perform operations of receiving a bitstream including a block of encoded video data and split information related to the block of the video data; determining a quadtree plus binarytree (QTBT) split structure for the block of the video data using the split information; and decoding the block of the encoded video data in the unit of blocks respectively corresponding to leaf nodes of the QTBT.

In accordance with another aspect of the present invention, provided is a method for decoding video data, including receiving a bitstream including a block of encoded video data and split information related to the block of the video data; determining a quadtree plus binarytree (QTBT) split structure for the block of the video data using the split information; and decoding the block of the encoded video data in the unit of blocks respectively corresponding to leaf nodes of the QTBT. Herein, the QTBT split structure is configured such that a binary tree is rooted from a leaf node of a quadtree, wherein the leaf node of the quadtree is allowed to be split into two child nodes, the two child nodes being a concave block and a convex block.

In accordance with another aspect of the present invention, provided is a method for decoding video data, including receiving a bitstream including a coding tree unit (CTU) of encoded video data and split information related to the CTU of the video data; determining a quadtree plus binarytree (QTBT) split structure for the CTU using the split information; determining a prediction partition mode for each leaf node of the QTBT using the split information; and decoding the block of the encoded video data according to the prediction partition mode for each leaf node of the QTBT. In the binary tree of the QTBT, a given block may be split into two rectangles of the same size. The prediction partition mode allows the leaf node of the QTBT to be predicted by being split into two triangles of the same size.

DETAILED DESCRIPTION

Figure 1:
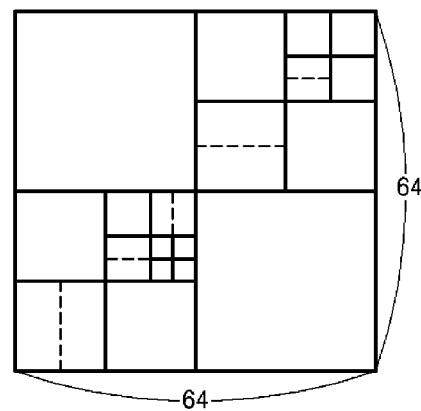
FIG. 1 is a conceptual diagram of an exemplary quadtree block structure for a CTU.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

Figure 2A:
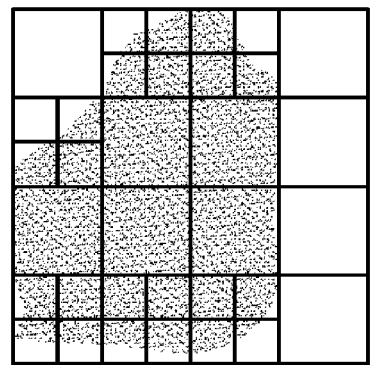
FIG. 2(A) is a diagram illustrating a type of block splitting into squares and FIG. 2(B) is a diagram illustrating a type of block splitting into a combination of squares and triangles.
Figure 2B:
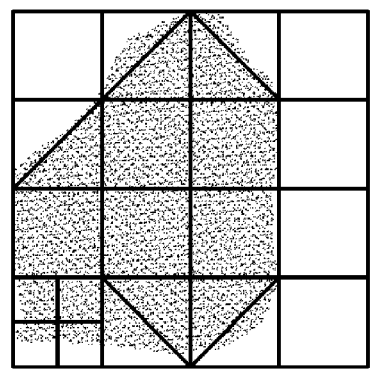

FIG. 2(A) is a diagram illustrating a type of block splitting into squares and FIG. 2(B) is diagram illustrating a type of block splitting into a combination of squares and triangles. As shown in FIG. 2(A), the conventional quadtree splitting method can reflect the given characteristics of a video (that is, the location, size, and shape of an object) to a certain extent by dividing a block into squares having various sizes. However, it should be noted that splitting into a combination of squares and triangles as illustrated in FIG. 2(B) may more efficiently reflect the given characteristics of a video (and thus be more advantageous for the encoding operation) than the splitting in FIG. 2(A)

Figure 3A:
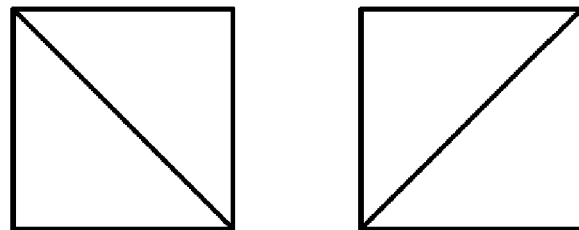
FIGS. 3A and 3B are diagrams illustrating triangular block-split types.
Figure 3B:
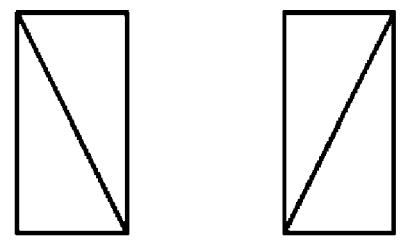

FIGS. 3A and 3B are diagrams illustrating triangular block-split types. FIG. 3A illustrates splitting a square block into two triangles of the same size. FIG. 3B illustrates splitting a rectangular block into two triangles of the same size. The proposed triangle blocks will be useful when there is a diagonal edge in a rectangle, as in the example of FIG. 2(B). That is, triangular areas having similar textures may be respectively set as one block, and thus the encoding efficiency may be enhanced.

Figure 4:
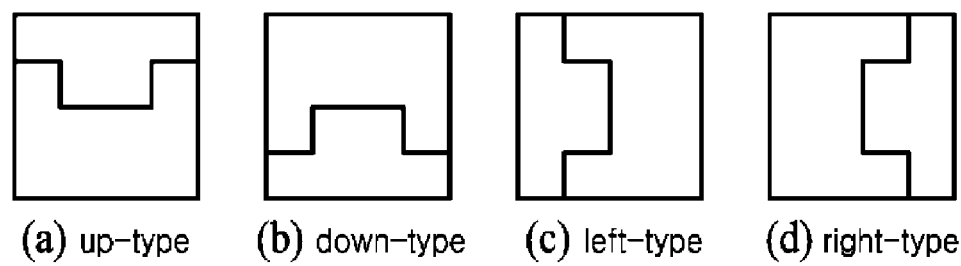
FIG. 4 is a diagram illustrating block splitting in a concavo-convex shape.

FIG. 4 is a diagram illustrating block splitting in a concavo-convex shape. FIG. 4 shows four types of splitting of a square block in a concavo-convex shape. The split types illustrated in FIG. 4 are distinguished from each other by the relative location of a convex block with respect to a concave block. When a video is split into a combination of such concave and convex blocks and rectangles, the given characteristics of the video may be more efficiently reflected.

The present disclosure generally relates to a block splitting method capable of more actively considering characteristics of a video and a technique of signaling the corresponding split information. The techniques of the present disclosure allow for a more flexible approach capable of using block partitions of various shapes besides the square shape or rectangular shape in video coding, thereby providing additional opportunities to improve coding compression and/or video quality.

Figure 5:
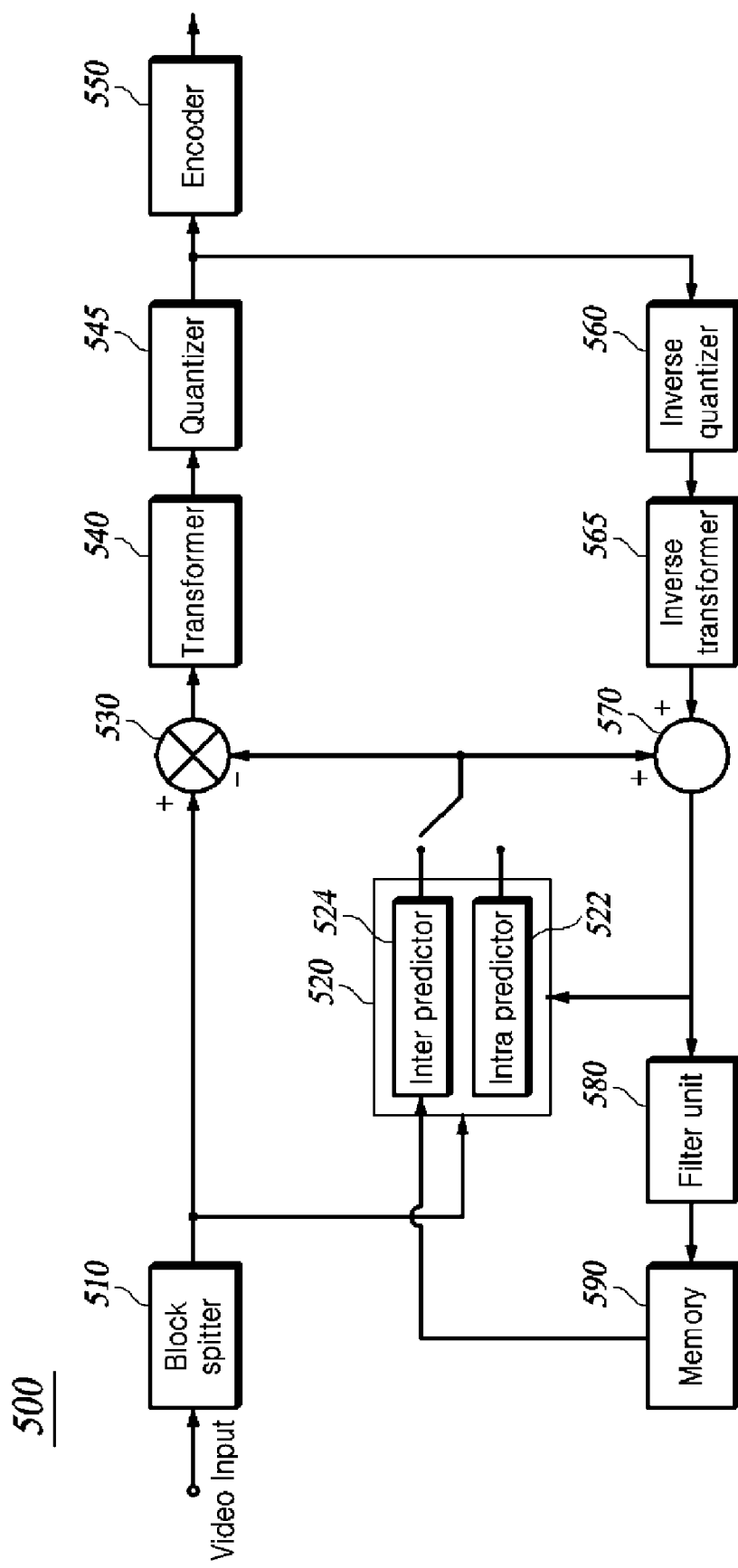
FIG. 5 is a block diagram of an exemplary video encoding apparatus in which techniques of the present disclosure can be implemented.

FIG. 5 is a block diagram of an exemplary video encoding apparatus in which techniques of the present disclosure can be implemented.

The video encoding apparatus includes a block splitter 510, a predictor 520, a subtractor 530, a transformer 540, a quantizer 345, an encoder 550, an inverse quantizer 560, an inverse transformer 565, an adder 570, a filter unit 580, and a memory 590. Each element of the video encoding apparatus may be implemented as a hardware chip, or may be implemented as software and the microprocessor may be implemented to execute the functions of the software corresponding to the respective elements.

The block splitter 510 splits each picture constituting video into a plurality of coding tree units (CTUs), and then recursively splits the CTUs using a tree structure. A leaf node in the tree structure is a coding unit (CU), which is a basic unit of coding. A QuadTree (QT) structure, in which a node (or a parent node) is split into four sub-nodes (or child nodes) of the same size, or a QuadTree plus BinaryTree (QTBT) structure including the QT structure and a BinaryTree (BT) structure, in which a node is split into two sub-nodes, may be used as the tree structure. That is, QTBT may be used to split the CTU into multiple CUs.

In the QuadTree plus BinaryTree (QTBT) structure, a CTU can be first split according to the QT structure. The quadtree splitting may be repeated until the size of the splitting block reaches the minimum block size MinQTSize of the leaf node allowed in QT. If the leaf node of the QT is not greater than the maximum block size MaxBTSize of the root node allowed in the BT, it may be further partitioned in a BT structure. The BT may have a plurality of split types. For example, in some examples, a rectangular split type of splitting a block of the node into two rectangles of the same size may be used. In some other examples, a triangular split type of splitting a block of the node two triangles of the same size may be additionally used in BT split. In still other examples, a concavo-convex split type of splitting a given block into a concave block and a convex block may be used. The rectangular split type may be divided into a horizontal split type and a vertical split type according to the split directions. The triangular split type may be divided into a down-right split type and an up-right split type according to the split directions. The concavo-convex split type may be divided into four split types according to the split directions (i.e., the relative locations of the concave block and the convex block), as shown in FIG. 4.

The split information generated by the block splitter 510 by splitting the CTU by the QTBT structure is encoded by the encoder 550 and transmitted to the video decoding apparatus.

Hereinafter, a block corresponding to a CU (i.e., a leaf node of the QTBT) to be encoded or decoded is referred to as a "current block."

The predictor 520 generates a prediction block by predicting a current block. The predictor 520 includes an intra predictor 522 and an inter predictor 524.

The intra predictor 522 predicts pixels in the current block using pixels (reference samples) located around the current block in a current picture including the current block. There are plural intra prediction modes according to the prediction directions, and the neighboring pixels to be used and the calculation equation to be used is defined differently according to each prediction mode. In particular, the intra predictor 522 may determine an intra prediction mode to be used for encoding the current block. In some examples, the intra-predictor 522 may encode the current block using several intra prediction modes and select an appropriate intra prediction mode to use from among the tested modes. For example, the intra-predictor 522 may calculate rate-distortion values using a rate-distortion analysis for several tested intra prediction modes, and select an intra prediction mode having the best rate distortion characteristics among the tested modes.

Figure 6:
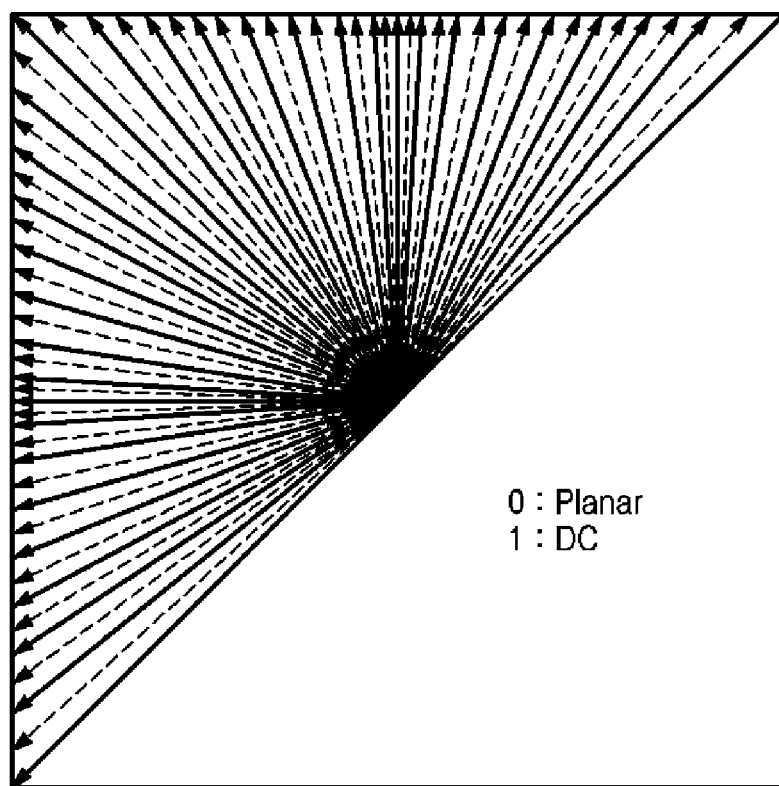
FIG. 6 shows an example of a plurality of intra prediction modes.

FIG. 6 shows an example of a plurality of intra prediction modes.

As shown in FIG. 6, the plurality of intra prediction modes may include two non-directional modes (a planar mode and a DC mode) and 65 directional modes.

The intra predictor 522 selects one intra prediction mode from among the plurality of intra prediction modes, and predicts the current block using neighboring pixels (which can be referred to as reference pixels or reference samples) and an equation determined according to the selected intra prediction mode. The information about the selected intra prediction mode is encoded by the encoder 550 and transmitted to the video decoding apparatus.

In order to efficiently encode an intra prediction mode information indicating which of the plurality of intra prediction modes is used as the intra prediction mode of the current block, the intra predictor 522 may determine some of the intra prediction modes that are most likely to be used as the intra prediction mode of the current block as the most probable modes (MPMs). Then, the intra predictor 522 generates mode information indicating whether the intra prediction mode of the current block is selected from among the MPMs, and transmits the mode information to the encoder 550. When the intra prediction mode of the current block is selected from among the MPMs, the intra predictor transmits, to the encoder, first intra prediction information for indicating which mode of the MPMs is selected as the intra prediction mode of the current block. On the other hand, when the intra prediction mode of the current block is not selected from among the MPMs, second intra identification information for indicating which of the modes excluding the MPMs is selected as the intra prediction mode of the current block is transmitted to the encoder. Alternatively, the intra predictor 522 according to an aspect of the present invention may group MPMs and/or non-MPMs and signal the index of a group to which the intra mode for predicting the current block belongs, instead of explicitly signaling which mode among the MPMs and/or non-MPMs is selected as the intra prediction mode for predicting the current block.

Hereinafter, a method of constructing an MPM list will be described. While six MPMs are described as constituting the MPM list, the present invention is not limited thereto. The number of MPMs included in the MPM list may be selected within a range of three to ten.

Figure 7:
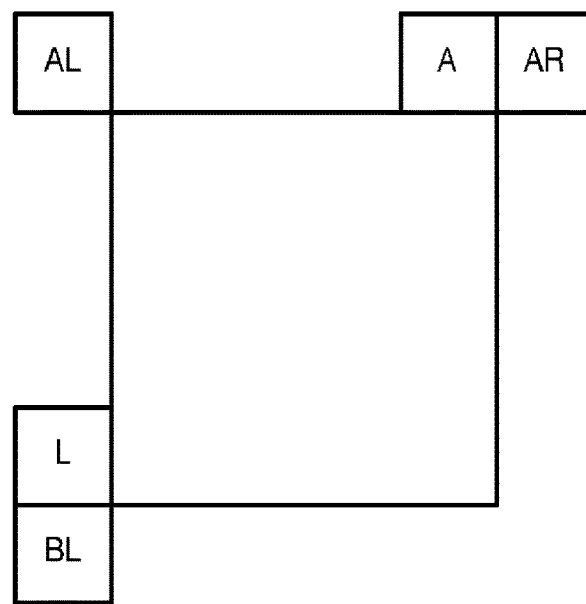
FIG. 7 is an exemplary diagram of neighboring blocks of a current block.

First, the MPM list is configured using intra prediction modes of neighboring blocks for the current block. In an example, as shown in FIG. 7, the neighboring blocks may include a part or the entirety of a left block L, an above block A, a bottom left block BL, an above right block AR, and an above left block AL of the current block.

The intra prediction modes of these neighboring blocks are included in the MPM list. Here, the intra prediction modes of the available blocks are included in the MPM list in order of the left block L, the above block A, the bottom left block BL, the above right block AR, and the above left block AL, and candidates are configured by adding the planar mode and the DC mode to the intra prediction modes of the neighboring blocks. Alternatively, available modes may be added to the MPM list in order of the left block L, the above block A, the planar mode, the DC mode, the bottom left block BL, the above right block AR, and the above left block AL. Alternatively, available modes may be added to the MPM list in order of the left block L, the above block A, the planar mode, the bottom left block BL, the above right block AR, the above left block AL, and the DC mode.

Only different intra prediction modes are included in the MPM list. That is, when there are duplicated modes, only one of the duplicated modes is included in the MPM list.

When the number of MPMs in the list is less than a predetermined number (e.g., 6), the MPMs may be derived by adding −1 or +1 to the directional modes in the list. In addition, when the number of MPMs in the list is less than the predetermined number, modes are added to the MPM list in order of the vertical mode, the horizontal mode, the diagonal mode, and so on.

The inter predictor 524 searches for a block most similar to the current block in a reference picture encoded and decoded earlier than the current picture, and generates a prediction block for the current block using the searched block. Then, the inter predictor 524 generates a motion vector corresponding to a displacement between the current block in the current picture and the prediction block in the reference picture. Motion information including information about the reference picture used to predict the current block and information about the motion vector is encoded by the encoder 550 and transmitted to the video decoding apparatus. The motion information may be generated in an AMVP (advanced motion vector prediction) mode or in a merge mode. In the case of the AMVP mode, the following information is generated as the motion information: a reference picture index, information on the motion vector predictor for use in predicting the motion vector of the current block, and a motion vector difference between the motion vector of the current block and the motion vector predictor. In the case of the merge mode, information for indicating a neighboring block of the current block is generated as the motion information. In the merge mode, the inter predictor 524 constructs a merge list by selecting a predetermined number of merge candidate blocks (hereinafter, "merge candidates") from the neighboring blocks for the current block. A merge candidate of which motion information is to be used as the motion information about the current block is selected from among the merge candidates included in the merge list and merge index information for identifying the selected candidate is generated. The generated merge index information is encoded by the encoder 550 and transmitted to the decoding apparatus. The inter predictor 524 sets the motion vector and reference picture index of the current block to the motion vector and reference picture index which have been set for the selected merge candidate. The inter predictor 524 generates, as the prediction block, a block which is indicated by the set motion vector within a reference picture identified by the set reference picture index.

The subtractor 530 subtracts the prediction block generated by the intra predictor 522 or the inter predictor 524 from the current block to generate a residual block.

The transformer 540 transforms residual signals in the residual block having pixel values in the spatial domain into transform coefficients in the frequency domain. The transformer 540 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 545 quantizes the transform coefficients output from the transformer 540 and outputs the quantized transform coefficients to the encoder 550.

The encoder 550 encodes the quantized transform coefficients using a coding scheme such as CABAC to generate a bitstream. The encoder 550 encodes information such as a CTU size, a MinQTSize, a MaxBTSize, a MaxBTDepth, a MinBTSize, QT_split_flag, and BT_split_flag, which are associated with the block split, such that the video decoding apparatus splits the block in the same manner as in the video encoding apparatus.

The encoder 550 encodes information about a prediction type indicating whether the current block is encoded by intra prediction or inter prediction, and encodes intra prediction information or inter prediction information according to the prediction type.

The inverse quantizer 560 inversely quantizes the quantized transform coefficients output from the quantizer 545 to generate transform coefficients. The inverse transformer 565 transforms the transform coefficients output from the inverse quantizer 560 from the frequency domain to the spatial domain and reconstructs the residual block.

The adder 570 adds the reconstructed residual block to the prediction block generated by the predictor 520 to reconstruct the current block. The pixels in the reconstructed current block are used as reference samples in performing intra prediction of the next block in order.

The filter unit 580 deblock-filters the boundaries between the reconstructed blocks in order to remove blocking artifacts caused by block-by-block encoding/decoding and stores the blocks in the memory 590. When all the blocks in one picture are reconstructed, the reconstructed picture is used as a reference picture for inter prediction of a block in a subsequent picture to be encoded.

Hereinafter, a video decoding apparatus will be described.

Figure 8:
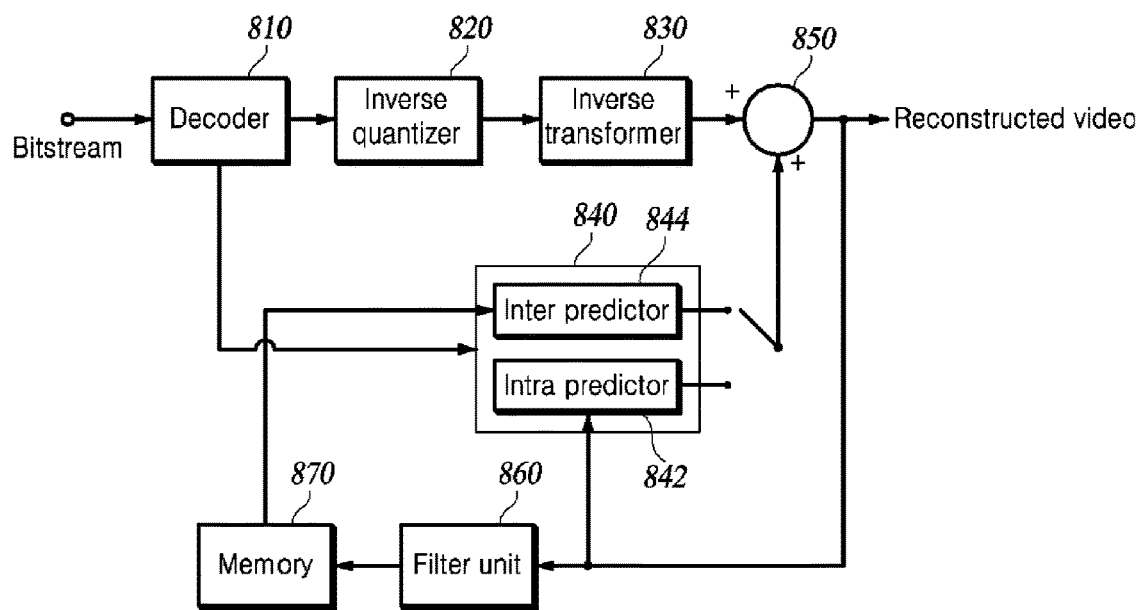
FIG. 8 is a block diagram of an exemplary video decoding apparatus in which techniques of the present disclosure can be implemented.

FIG. 8 is a block diagram of an exemplary video decoding apparatus in which techniques of the present disclosure can be implemented.

The video decoding apparatus includes a decoder 810, an inverse quantizer 820, an inverse transformer 830, a predictor 840, an adder 850, a filter unit 860, and a memory 870. As in the case of the video encoding apparatus of FIG. 5, each element of the video encoding apparatus may be implemented as a hardware chip, or may be implemented as software and the microprocessor may be implemented to execute the functions of the software corresponding to the respective elements.

The decoder 810 decodes a bitstream received from the video encoding apparatus, extracts information related to block splitting to determine a current block to be decoded, and extracts prediction information necessary to reconstruct the current block and information about a residual signal.

The decoder 810 extracts information about the CTU size from a high level syntax such as the sequence parameter set (SPS) or the picture parameter set (PPS), determines the size of the CTU, and splits a picture into CTUs of the determined size. Then, the decoder determines the CTU as the uppermost layer, that is, the root node, of a tree structure, and extracts split information about the CTU to split the CTU using a tree structure (e.g., the QTBT structure).

Upon determining the current block to be decoded through splitting of the tree structure, the decoder 810 extracts information about the prediction type indicating whether the current block is intra-predicted or inter-predicted.

When the prediction type information indicates intra prediction, the decoder 810 extracts a syntax element for the intra prediction information (intra prediction mode) about the current block. First, the decoder 810 extracts mode information (i.e., MPM flag) indicating whether the intra prediction mode of the current block is selected from among the MPMs. In general, when the mode information indicates that the intra prediction mode of the current block is selected from among the MPMs, the decoder extracts first intra prediction information for indicating which mode of the MPMs is selected as the intra prediction mode of the current block. When the intra prediction mode encoding information indicates that the intra prediction mode of the current block is not selected from among the MPMs, the decoder extracts second intra identification information for indicating which of the modes excluding the MPMs is selected as the intra prediction mode of the current block. Alternatively, the intra predictor 522 according to an aspect of the present invention may group MPMs and/or non-MPMs and extracts intra identification information (e.g., the index of a group) indicating a group to which the intra mode for predicting the current block belongs, instead of extracting intra identification information indicating which mode among the MPMs and/or non-MPMs is selected as the intra prediction mode for predicting the current block. When the prediction type information indicates inter prediction, the decoder 810 extracts syntax elements for inter prediction information. The merge index information is extracted in the case of the merge mode, while the reference picture index, the information on the motion vector predictor, and the motion vector difference are extracted in the case of the AMVP mode.

The decoder 810 extracts information about the quantized transform coefficients of the current block as information about the residual signal.

The inverse quantizer 820 inversely quantizes the quantized transform coefficients. The inverse transformer 830 inversely transforms the inversely quantized transform coefficients from the frequency domain to the spatial domain to reconstruct the residual signals, and thereby generates a residual block for the current block.

The predictor 840 includes an intra predictor 842 and an inter predictor 844. The intra predictor 842 is activated when the prediction type of the current block is intra prediction, and the inter predictor 844 is activated when the prediction type of the current block is inter prediction.

The intra predictor 842 determines an intra prediction mode of the current block among the plurality of intra prediction modes by using the syntax element for the intra prediction mode extracted from the decoder 810, and predicts the current block using reference samples neighboring to the current block according to the determined intra prediction mode.

To determine the intra prediction mode of the current block, the intra predictor 842 constructs an MPM list including a predetermined number of MPMs from the neighboring blocks around the current block. The method of constructing the MPM list is the same as that for the intra predictor 522 of FIG. 5.

Generally, when the intra prediction mode information (i.e., the MPM flag) indicates that the intra prediction mode of the current block is selected from among the MPMs, the intra predictor 842 selects, as the intra prediction mode of the current block, the MPM indicated by the first intra identification information among the MPMs in the MPM list. On the other hand, when the mode information indicates that the intra prediction mode of the current block is not selected from among the MPMs, intra predictor 842 selects the intra prediction mode of the current block among the intra prediction modes other than the MPMs in the MPM list, using the second intra identification information.

Alternatively, as described above, the intra predictor 522 of the video encoding apparatus according to an aspect of the present invention groups MPMs and/or non-MPMs and signals the index of a group to which the intra mode for predicting the current block belongs, instead of explicitly signaling which mode among the MPMs and/or non-MPMs is selected as the intra prediction mode for predicting the current block. In this case, the intra predictor 842 of the video decoding apparatus may determine the final intra mode (i.e., the intra mode for predicting the current block) by evaluating the intra modes belonging to the group. For example, in some examples, the intra-predictor 842 may generate reconstructed blocks for multiple intra modes belonging to a group, and evaluate the reconstructed blocks to determine a final intra mode.

The inter predictor 844 determines the motion information about the current block using the syntax elements for the inter mode extracted by the decoder 810, and predicts the current block using the determined motion information. In the case of the merge mode, the inter predictor 844 constructs a merge list by selecting a predetermined number of merge candidates from the neighboring blocks for the current block, and selects a merge candidate indicated by the merge index information among the candidates included in the merge list. The inter predictor 844 sets the motion vector and reference picture index of the current block to the motion vector and reference picture index which have been set for the selected merge candidate. The inter predictor 844 generates, as the prediction block of the current block, a block which is indicated by the set motion vector within a reference picture identified by the set reference picture index. In the case of the AMVP mode, the inter predictor 844 determines the motion vector predictor using the information on the motion vector predictor extracted by the decoder 810, and determines the motion vector of the current block by adding the motion vector predictor and the motion vector difference. The inter predictor 844 generates, as the prediction block of the current block, a block which is indicated by the determined motion vector of the current block within a reference picture identified by the reference picture index that the decoder 810 extracts.

The adder 850 adds the residual block output from the inverse transformer and the prediction block output from the inter predictor or intra predictor to reconstruct the current block. The pixels in the reconstructed current block are utilized as reference samples for intra prediction of a block to be decoded later.

The filter unit 860 deblock-filters the boundaries between the reconstructed blocks in order to remove blocking artifacts caused by block-by-block decoding and stores the deblock-filtered blocks in the memory 870. When all the blocks in one picture are reconstructed, the reconstructed picture is used as a reference picture for inter prediction of blocks in a subsequent picture to be decoded.

The techniques of the present disclosure generally relate to a technique for signaling split information representing a QTBT block split structure that allows not only rectangular blocks but also triangular or concavo-convex blocks, and a technique for determining block partitioning from split information. One aspect of the techniques of the present disclosure may be carried out by the encoder 550 of the video encoding apparatus illustrated in FIG. 5 and/or the decoder 810 of the video decoding apparatus illustrated in FIG. 8. In other examples, one or more other units of the video encoding apparatus and/or video decoding apparatus may additionally or alternatively be responsible for carrying out the techniques of the present disclosure. QTBT block partitioning may be used to partition a CTU into CUs. That is, the root node of the QTBT may be a CTU, and a leaf node of the QTBT may be a CU.

In the QTBT structure, the CTU, which is the root node, may be first split according to the QT structure. The video encoding apparatus uses a QT split flag QT_split_flag to signal whether the root node of the QTBT is split according to the QT structure. As shown in Table 1, QT_split_flag=0 indicates that the root node is not QT-split, and QT_split_flag=1 indicates that the root node is split into four blocks of the same size.

TABLE 1

| QT split flag | Value |
|---|---|
| No split | 0 |
| Split | 1 |

QT split of each node may be recursively repeated. BT split may be performed on the blocks that are not subjected to QT split (i.e., the leaf nodes of the QT). The BT split proposed in the present disclosure may have a plurality of split types. For example, in some examples, a rectangular split type of splitting a block of a node into two rectangles of the same size may be used. In some other examples, a triangular split type of splitting a block of the node into two triangles of the same size may be additionally used in BT split. In still other examples, a concavo-convex split type of splitting a given block into a concave block and a convex block may be used.

Hereinafter, some embodiments relating to the split types allowed in BT split and a method of signaling the same will be described.

First Embodiment (BT Split—Combination of Rectangular Split and Triangular Split)

Figure 9:
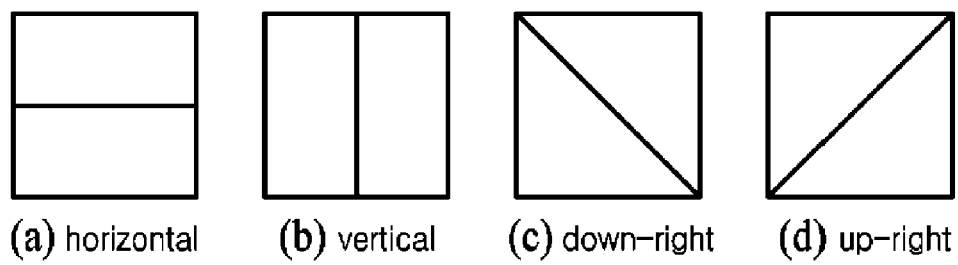
FIG. 9 is a conceptual diagram of split partitions allowed in BT split according to an embodiment of the present invention.

FIG. 9 is a conceptual diagram of split partitions allowed in BT split according to an embodiment of the present invention.

In this embodiment, rectangular split and triangular split are used for the BT split. Rectangular split is splitting a given (square or rectangular) block into two rectangles of the same size, and triangular split is splitting a given (square or rectangular) block into two triangles of the same size. FIGS. 9(a) and 9(b) are examples of two types of rectangular split, and FIGS. 9(c) and 9(d) are examples of two types of triangular split. The rectangular split is divided into horizontal split and vertical split according to the split directions, and the triangular split is divided into down-right split and up-right split according to the split directions. Accordingly, in this embodiment, the BT split is divided into four types according to shapes and directions.

Although FIG. 9 illustrates cases where a square block is divided into two rectangles or two triangles, it should be noted that a rectangular block can be divided into two rectangles or two triangles. Therefore, a rectangular block may be further divided into two rectangles or two triangles. On the other hand, a triangular block is not further split.

Figure 10:
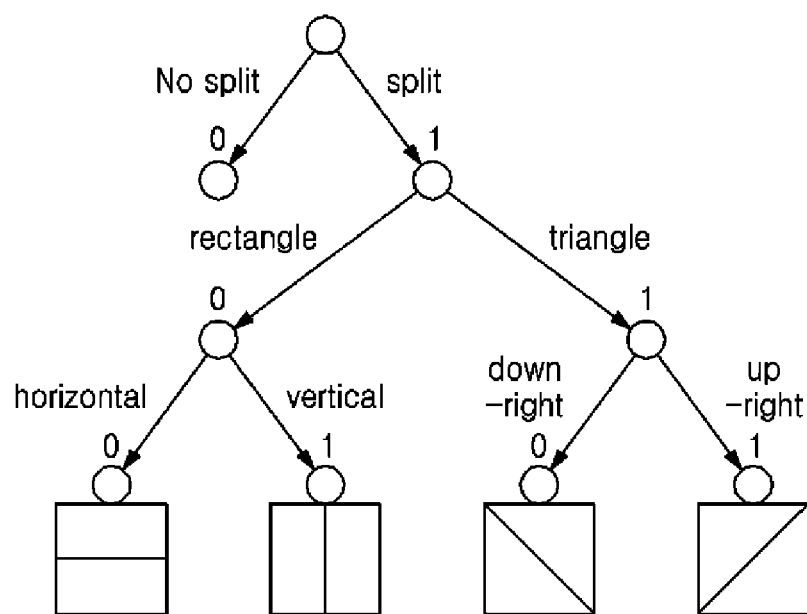
FIG. 10 is a tree diagram illustrating an example of a method of allocating bits to four BT split types illustrated in FIG. 9.

FIG. 10 is a tree diagram illustrating an example of a method of allocating bits to four BT split types illustrated in FIG. 9.

Referring to FIG. 10, one bit is assigned to indicate whether BT split is selected. When BT split is selected, one bit for indicating the type of BT split (i.e., whether triangular split is selected or rectangular split is selected) and one bit for indicating the split direction are additionally allocated. Therefore, a BT split type for a given block may be represented by 3 bits.

Table 2 summarizes the bits assigned to each BT split type. As shown in Table 2, the first bin of the BT split flag indicates whether the block is subjected to BT split, the second bin indicates the type of BT split (i.e., whether the splitting is rectangular split or triangular split), and the third bin indicates the split direction of the BT split (i.e., the direction of the rectangular split or the direction of the triangular split).

TABLE 2

| BT split flag | Value |
| --- | --- |
| No split | 0 |
| Split rectangle (horizontal) | 100 |
| Split rectangle (vertical) | 101 |
| Split triangle (down-right) | 110 |
| Split triangle (up-right) | 111 |

Figure 11A:
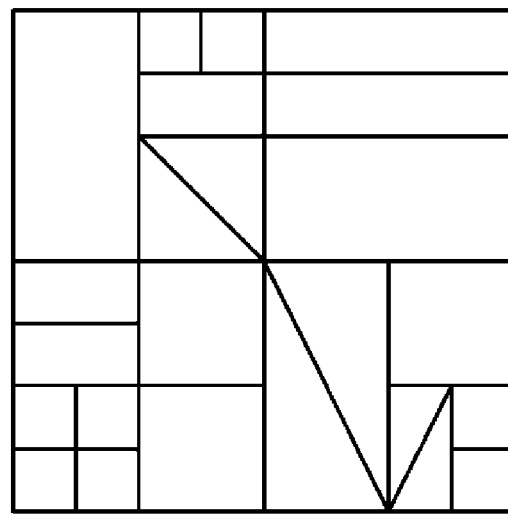
FIG. 11A is a conceptual diagram of an exemplary QTBT split structure according to an embodiment of the present invention.
Figure 11B:
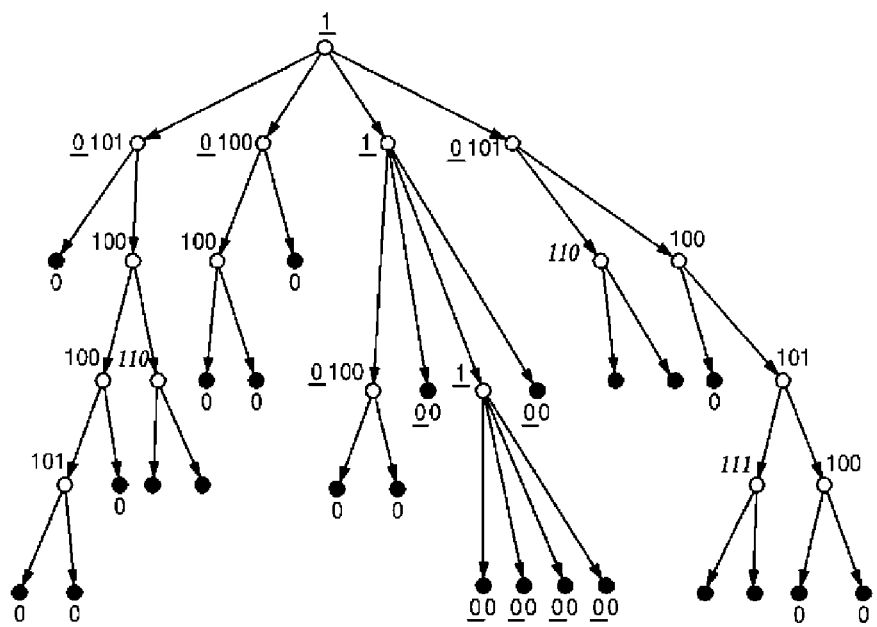
FIG. 11B is a diagram illustrating representation of the QTBT split structure of FIG. 11A in a tree structure.

FIG. 11A is a conceptual diagram of an exemplary QTBT split structure according to an embodiment of the present invention, and FIG. 11B is a diagram illustrating representation of the QTBT split structure of FIG. 11A in a tree structure. In FIG. 11B, the black circle indicates a leaf node of a QTBT split structure, and a white circle indicates a node subjected to QT split or BT split. In addition, bits marked on each node refer to the QT split flag and the BT split flag based on Tables 1 and 2. Among the bits assigned to each node, the underlined bits are QT split flags, and the remaining bits are BT split flags. Note that in FIG. 11B, bit "0" is not assigned to the child nodes of the nodes to which "I/O" and "I/O" in italics are assigned. As described above, a triangular block corresponds to a leaf node that is not further split. Accordingly, when a given node is subjected to triangular split, it is not necessary to signal that the child node of the given node is not further subjected to BT split.

Alternatively, when a block is split into triangular blocks, the triangular blocks may have child nodes. In this case, the child nodes may be triangular blocks obtained by bisecting the parent node thereof. The triangular split is independently determined for each of the two triangular blocks, which are the parent nodes. The corresponding split flag may be set to "0" if splitting is not performed, and set to "1" if splitting is performed.

Second Embodiment (BT Split—Combination of Rectangular Split and Concavo-Convex Split)

In this embodiment, concavo-convex partitions illustrated in FIG. 4 are used for the BT split. The concavo-convex partitions are classified in four types according to the split directions (that is, according to the relative locations of the convex blocks with respect to the concave blocks).

Figure 12:
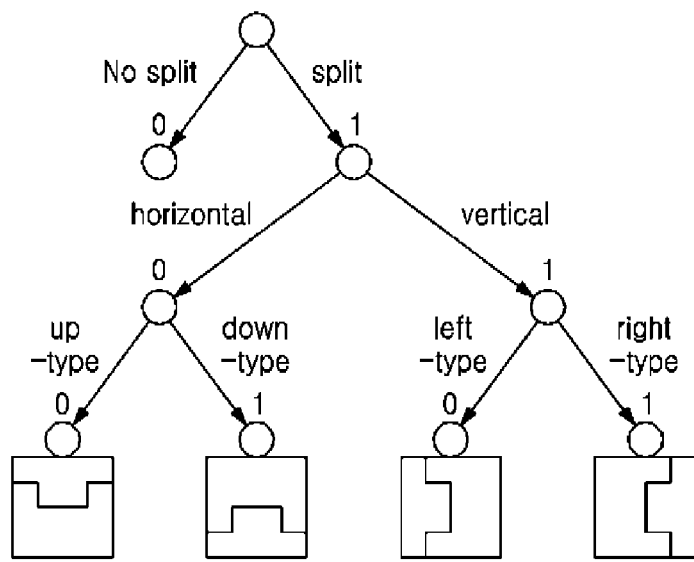
FIG. 12 is a tree diagram illustrating an example of a method of allocating bits to concavo-convex split types illustrated in FIG. 4.

FIG. 12 is a tree diagram illustrating an example of a method of allocating bits to concavo-convex split types illustrated in FIG. 4. Referring to FIG. 12, one bit is allocated to indicate whether BT split is selected. When BT split is selected, two bits are further allocated to indicate the type of the selected concavo-convex split. The bits assigned to each of the split patterns are summarized in Table 3. As shown in Table 3, the first bin of the BT split flag indicates whether the block is subjected to BT split, and the second bin and the third bin indicate the type of the applied concavo-convex split.

TABLE 3

| BT split flag | Value |
| --- | --- |
| No split | 0 |
| Split rectangle (horizontal) | 100 |
| Split down-type | 101 |
| Split left-type | 110 |
| Split right-type | 111 |

In this embodiment, once a square (or rectangular) block is split in a concavo-convex shape, the split blocks are not further divided in the BT structure. Therefore, it is not necessary to signal the BT split flag for the concavo-convex child nodes of the BT-split nodes.

Third Embodiment (Allowing Triangular Split for PU)

In the technique proposed in this embodiment, the rectangular splits illustrated in FIGS. 9(a) and 9(b) are used for BT split in the QTBT split structure of a CTU for determining a coding unit (CU), and the triangular splits illustrated in FIGS. 9(c) and 9(d) are used for splitting of a CU for determining a prediction unit (PU). That is, while the first embodiment allows a triangular CU, this embodiment allows a triangular PU. Here, the triangular PU may be described as a partition mode for predicting the corresponding CU.

Figure 13:
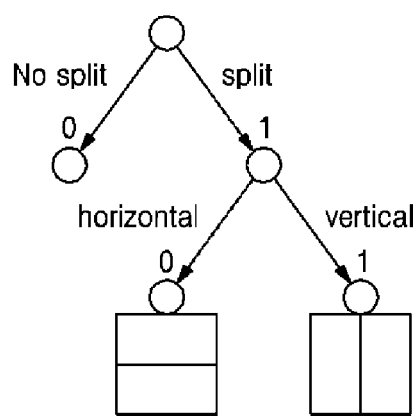
FIG. 13 is a tree diagram illustrating an example of a bit allocation method for BT split in which rectangular splits are allowed.

FIG. 13 is a tree diagram illustrating an example of a bit allocation method for BT split in which rectangular splits are allowed. Referring to FIG. 13, one bit is assigned to indicate whether BT split is selected. When BT split is selected, one bit is additionally assigned to indicate the direction of BT split (i.e., the direction of the rectangular split). Therefore, the BT split type for a given block may be represented by 2 bits. Table 4 summarizes the bits assigned to each type of BT split. As shown in Table 4, the first bin of the BT split flag indicates whether the block is subjected to BT split, and the second bin indicates the split direction of the BT split (i.e., the direction of the rectangular split).

TABLE 4

| BT split flag | Value |
| --- | --- |
| No split | 0 |
| Split horizontal | 10 |
| Split vertical | 11 |

Figure 14A:
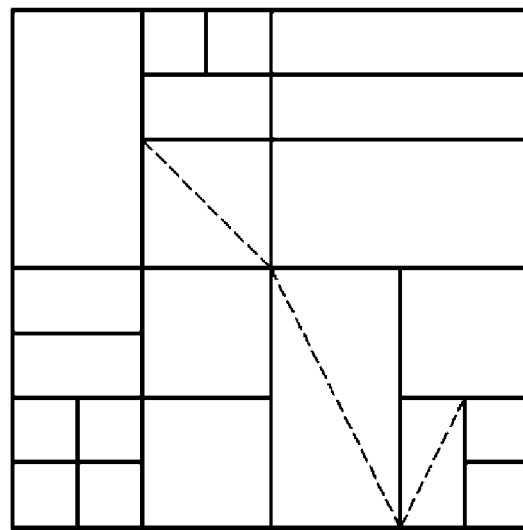
FIG. 14A is a conceptual diagram of an exemplary CU partition and a PU partition according to an embodiment of the present invention.
Figure 14B:
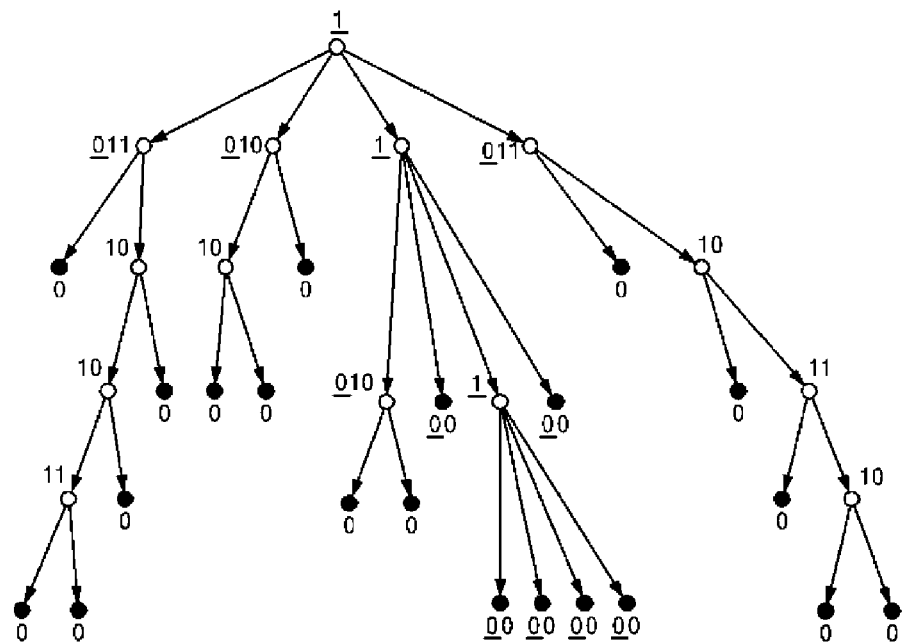
FIG. 14B is a tree diagram illustrating the CU partition of FIG. 14A.

FIG. 14A is a conceptual diagram of an exemplary CU partition and a PU partition according to an embodiment of the present invention, and FIG. 14B is a tree diagram illustrating the CU partition of FIG. 14A. In FIG. 14A, solid lines indicate CU splits in the QTBT split structure, and dotted lines indicate PU splits. In FIG. 14B, the black circle indicates a leaf node of the QTBT split structure, and the white circle indicates a node that is subjected to QT split or BT split. In addition, the bits marked on each node refer to the QT split flag based on Table 1 and the BT split flags based on Table 4.

Once a CU partition is determined, the video encoding apparatus should signal PU partition information (or mode type) about the corresponding CU. Signaling of the mode type is performed for all CUs corresponding to the leaf nodes in FIG. 14B. Information about the mode type of one CU may be indicated as shown in Table 5.

TABLE 5

| BT split flag | Value |
| --- | --- |
| Quadrangle | 0 |
| Triangle (down-right) | 10 |
| Triangle (up-right) | 11 |

Figure 15:
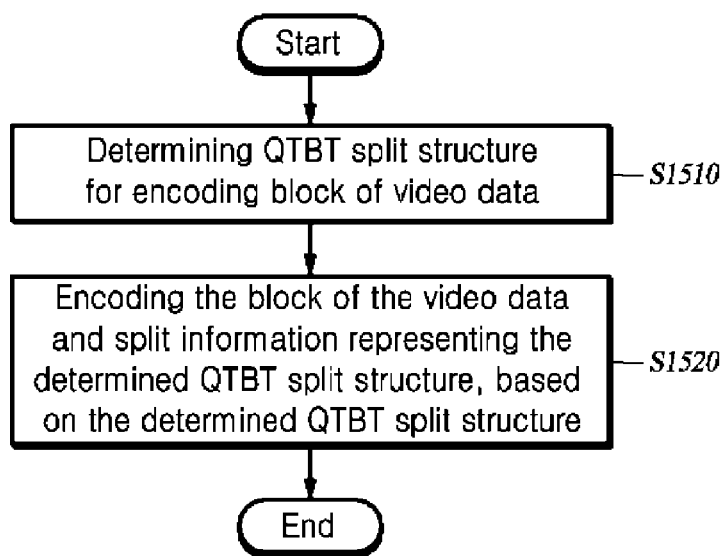
FIG. 15 is a flowchart illustrating an exemplary operation of the video encoding apparatus of encoding a video.

FIG. 15 is a flowchart illustrating an exemplary operation of the video encoding apparatus for encoding a video.

In the example of FIG. 15, the video encoding apparatus determines a QTBT spit structure for encoding a block of video data (S1510). The QTBT block partitioning structure is a structure in which a binary tree is rooted from a leaf node of a quadtree. In some examples, the binary tree is defined by a plurality of split types in which a parent node is split into two child nodes. The split types may include a triangular split type and a rectangular split type. In the binary tree, the nodes that are generated by the split according to the triangular split type are not further split. In the binary tree, the nodes that are generated by the split according to the rectangular split type are allowed to be further split into two child nodes. In some other examples, a leaf node of the quadtree is allowed to be split into two child nodes, and the two child nodes may be a concave block and a convex block. In this case, the child nodes may not be further split.

The video encoding apparatus generates an encoded bitstream including a block of the video data and split information representing the determined QTBT split structure, based on the determined QTBT split structure (S1520).

Figure 16:
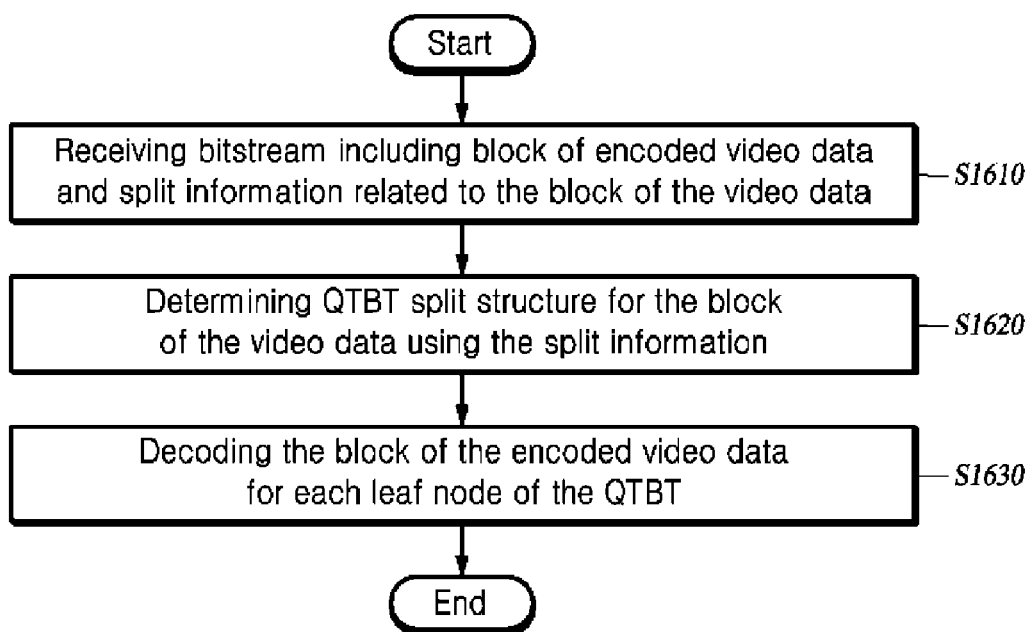
FIG. 16 is a flowchart illustrating an exemplary operation of the video decoding apparatus of decoding a video.

FIG. 16 is a flowchart illustrating an exemplary operation of the video decoding apparatus for decoding a video.

In the example of FIG. 16, the video decoding apparatus receives a bitstream including a block of encoded video data and split information related to the block of the video data (S1610).

The video decoding apparatus determines the QTBT split structure for the block of the video data using the split information (S1620). The QTBT split structure is a structure in which a binary tree is rooted from a leaf node of a quadtree. In some examples, the binary tree is defined by a plurality of split types in which a parent node is split into two child nodes. The split types may include a triangular split type and a rectangular split type. In the binary tree, the nodes that are generated by the split according to the triangular split type are not further split. In the binary tree, the nodes that are generated by the split according to the rectangular split type are allowed to be further split into two child nodes. In some other examples, a leaf node of the quadtree is allowed to be split into two child nodes, and the two child nodes may be a concave block and a convex block. In this case, the child nodes may not be further split.

The video decoding apparatus decodes the block of the encoded video data in the unit of blocks respectively corresponding to leaf nodes of the QTBT (S1630).

Figure 17:
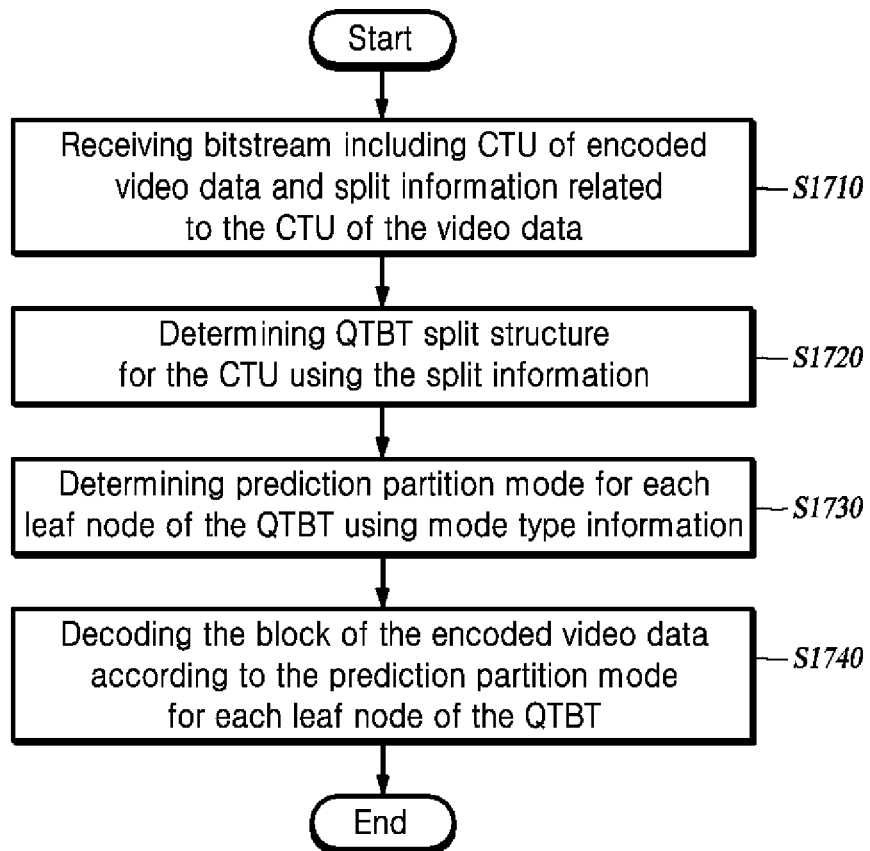
FIG. 17 is a flowchart showing another exemplary operation of the video decoding apparatus of decoding video.

FIG. 17 is a flowchart showing another exemplary operation of the video decoding apparatus for decoding a video.

In the example of FIG. 17, the video decoding apparatus receives a bitstream including a coding tree unit (CTU) of the encoded video data and split information related to the CTU of the video data (S1710).

The video decoding apparatus determines the QTBT split structure for the CTU using the split information (S1720). Here, the QTBT split structure is a structure in which a binary tree is rooted from a leaf node of a quadtree. In the binary tree, a given block is split into two rectangles of the same size. Nodes that are generated by the split according to the rectangular split type are allowed to be further split into two child nodes. Thus, the leaf nodes (i.e., CUs) of the QTBT may have a square or rectangular shape.

The video decoding apparatus determines a prediction partition mode for each leaf node of the QTBT using mode type information (S1730). The prediction partition mode allows the leaf node of the QTBT to be predicted by being split into two triangles of the same size. Thus, the PU may have a square, rectangular, or triangular shape.

The video decoding apparatus decodes the block of the encoded video data according to the prediction partition mode for each leaf node of the QTBT (S1740).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand the scope of the embodiments is not limited by the explicitly described above embodiments but is inclusive of the claims and equivalents thereof.

What is claimed is:

1. An apparatus for decoding video data, comprising:
a decoder configured to
receive a bitstream including a coding tree unit (CTU) of encoded video data and split information related to a tree split structure of the CTU of the video data, wherein the bitstream includes information on maximum block size allowed for the root node of a binary tree,
determine a square or rectangular shaped coding block to be decoded, wherein the coding block is a block which is split from the CTU in the tree split structure using the split information and corresponds to a leaf node of the tree split structure, the tree split structure allowing, depending on the split information, a quadtree having multi-depth of consecutive quadtree divisions and a binary tree having multi-depth of consecutive binary tree divisions, wherein the tree split structure is configured such that the binary tree is rooted from a leaf node of the quadtree when a size of a block corresponding to the leaf node of the quadtree is not greater than the maximum block size, and after determining the coding block to be decoded by splitting the CTU in the tree split structure, determine a prediction partition mode for the coding block corresponding to the leaf node of the tree split structure among a plurality of prediction partition modes using mode type information included in the bitstream, the plurality of prediction partition modes including at least one prediction partition mode allowing the coding block to be predicted by being split into two equal-sized triangles; and a reconstructor configured to reconstruct the coding block corresponding to the leaf node according to the determined prediction partition mode, wherein the reconstructor is configured to reconstruct the coding block which is split into the two triangles, by performing a process comprising:

configuring a plurality of merge candidates comprised of motion vectors of pre-decoded blocks neighboring to the coding block, reconstructing, from the bitstream, two merge indexes which respectively correspond to the two triangles, wherein each of the merge indexes is used for indicating one of the plurality of merge candidates, setting motion vectors respectively corresponding to the two triangles equal to merge candidates which are respectively indicated by the two merge indexes among the plurality of merge candidates, and inter-predicting the coding block which is split into the two triangles, by using the set motion vectors, wherein the at least one prediction partition mode includes a down-right diagonal split type and an up-right diagonal split type.

2. The apparatus of claim 1, wherein the bitstream includes information on minimum block size allowed for the leaf node of the quadtree, wherein a block having the minimum block size is not further split in the quadtree.

3. The apparatus of claim 1, wherein the split information includes information for indicating one among a plurality of split types for binary tree division.

4. A method of encoding video data, the method comprising:

encoding restriction information related to a tree split structure, the restriction information including information on maximum block size allowed for a root node of a binary tree;

splitting a coding tree unit (CTU) in the tree split structure and encoding split information related to the tree split structure of the CTU, the tree split structure allowing a quadtree having multi-depth of consecutive quadtree divisions and a binary tree having multi-depth of consecutive binary tree divisions, wherein the tree split structure is configured such that the binary tree is rooted from a leaf node of the quadtree when a size of a block corresponding to the leaf node of the quadtree is not greater than the maximum block size;

selecting, from a plurality of prediction partition modes, a prediction partition mode for a square or rectangular shaped coding block corresponding to a leaf node of the tree split structure, and encoding mode type information for representing the selected prediction partition mode, wherein the plurality of prediction partition modes includes at least one prediction partition mode allowing the coding block to be predicted by being split into two equal-sized triangles; and encoding the coding block according to the selected prediction partition mode, wherein, when the coding block is split into the two triangles, the encoding of the coding block comprises:

configuring a plurality of merge candidates comprised of motion vectors of pre-decoded blocks neighboring to the coding block;

setting motion vectors respectively corresponding to the two triangles equal to two merge candidates included in the plurality of merge candidates;

encoding merge index information for indicating the two merge candidates which are set as motion vectors respectively corresponding to the two triangles, inter-predicting the coding block which is split into the two triangles, by using the set motion vectors, wherein the at least one prediction partition mode includes a down-right diagonal split type and an up-right diagonal split type.

5. The method of claim 4, wherein the restriction information includes information on minimum block size allowed for the leaf node of the quadtree, wherein a block having the minimum block size is not further split in the quadtree.

6. The method of claim 4, wherein the split information includes information for indicating one among a plurality of split types for binary tree division.

7. A non-transitory computer readable medium storing a bitstream containing encoded video data, the bitstream being decoded by a process comprising:

receiving the bitstream including a coding tree unit (CTU) of encoded video data and split information related to a tree split structure of the CTU, wherein the bitstream further includes information on maximum block size allowed for a root node of a binary tree;

determining a square or rectangular shaped coding block to be decoded, wherein the coding block is a block which is split from the CTU in the tree split structure using the split information and corresponds to a leaf node of the tree split structure, the tree split structure allowing, depending on the split information, a quadtree having multi-depth of consecutive quadtree divisions and a binary tree having multi-depth of consecutive binary tree divisions, wherein the tree split structure is configured such that the binary tree is rooted from a leaf node of the quadtree when a size of a block corresponding to the leaf node of the quadtree is not greater than the maximum block size;

after determining the coding block to be decoded by splitting the CTU in the tree split structure, determining a prediction partition mode for the coding block corresponding to the leaf node of the tree split structure among a plurality of prediction partition modes using mode type information included in the bitstream, the plurality of prediction partition modes including at least one prediction partition mode allowing the coding block to be predicted by being split into two equal-sized triangles; and decoding the coding block corresponding to the leaf node according to the determined prediction partition mode, wherein, when the coding block is split into the two triangles according to the determined prediction partition mode, the decoding of the coding block comprises:

configuring a plurality of merge candidates comprised of motion vectors of pre-decoded blocks neighboring to the coding block;

reconstructing, from the bitstream, two merge indexes which respectively correspond to the two triangles, wherein each of the merge indexes is used for indicating one of the plurality of merge candidates;

setting motion vectors respectively corresponding to the two triangles equal to merge candidates which are respectively indicated by the two merge indexes among the plurality of merge candidates; and inter-predicting the coding block which is split into the two triangles, by using the set motion vectors, and wherein the at least one prediction partition mode includes a down-right diagonal split type and an up-right diagonal split type.

\* \* \* \* \*